United States Patent [19]

Kelly et al.

[11] Patent Number: 5,873,703

[45] Date of Patent: Feb. 23, 1999

[54] REPAIR OF GAMMA TITANIUM ALUMINIDE ARTICLES

[75] Inventors: Thomas J. Kelly, Cincinnati; Russell W. Smashey, Loveland, both of Ohio; Eric J. Boerger, Ft. Mitchell, Ky.; Ronald L. Sheranko, Cincinnati, Ohio

[73] Assignee: General Electric Company, Cincinnati, Ohio

[21] Appl. No.: 785,401

[22] Filed: Jan. 22, 1997

[51] Int. Cl.⁶ .................. F01D 5/28; B23P 6/04; B23K 1/04

[52] U.S. Cl. .................. 416/241 R; 416/213 R; 416/200; 29/402.16; 29/889.1; 228/119; 228/215; 228/232; 228/233.2; 228/262.72

[58] Field of Search ............ 415/200; 416/213 R, 416/223 A, 241 R; 29/402.09, 402.16, 402.07, 402.13, 889.1; 228/119, 215, 232, 233.2, 262.7, 262.71, 262.72; 428/636, 654, 660; 420/417

[56] References Cited

U.S. PATENT DOCUMENTS

| | | |
|---|---|---|
| 2,847,302 | 8/1958 | Long . |
| 3,615,277 | 10/1971 | Kreider et al. ............... 29/195 |
| 3,768,985 | 10/1973 | Woodward . |
| 4,285,459 | 8/1981 | Baladjanian et al. . |
| 4,411,960 | 10/1983 | Mizuhara ............... 428/660 |
| 4,611,744 | 9/1986 | Fraser et al. . |
| 4,634,039 | 1/1987 | Banerjee ............... 228/215 |
| 4,655,383 | 4/1987 | Fournes et al. . |
| 4,725,509 | 2/1988 | Ryan . |
| 4,842,183 | 6/1989 | Ntony et al. ............... 228/119 |
| 4,869,421 | 9/1989 | Norris et al. . |
| 5,071,054 | 12/1991 | Dzugan et al. . |
| 5,077,140 | 12/1991 | Luthra et al. ............... 420/660 |
| 5,080,860 | 1/1992 | Huang ............... 420/417 |
| 5,149,497 | 9/1992 | McKee et al. ............... 420/417 |
| 5,204,058 | 4/1993 | Huang ............... 420/417 |
| 5,280,849 | 1/1994 | Galanes . |
| 5,299,353 | 4/1994 | Nazmy et al. ............... 29/889.7 |
| 5,328,530 | 7/1994 | Semiatin et al. ............... 420/902 |
| 5,350,466 | 9/1994 | Larsen, Jr. et al. ............... 420/418 |
| 5,407,119 | 4/1995 | Churchill et al. ............... 228/232 |
| 5,417,781 | 5/1995 | McQuay et al. ............... 420/418 |
| 5,609,698 | 3/1997 | Kelly et al. ............... 148/671 |

*Primary Examiner*—Christopher Verdier
*Attorney, Agent, or Firm*—Andrew C. Hess; David L. Narciso

[57] ABSTRACT

A surface defect in a gamma titanium aluminide article is repaired by weld repairing the defect and thereafter sealing the surface-connected cracks in the weldment. The surface-connected cracks are repaired by applying to the region of the weldment a powder of a brazing filler metal that is compatible with the gamma titanium aluminide alloy and with the weldment, and thereafter heating the article to a brazing temperature above the liquidus of the brazing filler metal. The article is preferably hot isostatically pressed after the repair is completed to close internal defects that cannot otherwise be closed due to the surface connected cracks.

18 Claims, 3 Drawing Sheets

REPAIR OF GAMMA TITANIUM ALUMINIDE ARTICLES

The invention herein described was made in performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to the repair of articles made of gamma titanium aluminide alloys, and more particularly, to repair by a combined welding and brazing approach.

Titanium aluminides are a class of alloys whose compositions include at least titanium and aluminum, and typically some additional alloying elements such as chromium, niobium, vanadium, tantalum, manganese, and/or boron. The gamma titanium aluminides are based on the gamma phase found at nearly the equiatomic composition, with roughly 50 atomic percent each of titanium and aluminum, or slightly reduced amounts to permit the use of other alloying elements. The titanium aluminides, and particularly the gamma titanium aluminides, have the advantages of low density, good low and intermediate temperature strength and cyclic deformation resistance, and good environmental resistance.

Gamma titanium aluminides can be used in aircraft engines. They potentially have applications such as low-pressure turbine blades and vanes, bearing supports, compressor casings, high pressure and low pressure hangars, frames, exhaust nozzle flaps, diffusers, and low pressure turbine brush seal supports. They may also have application in other products such as automotive valves and superchargers.

Articles made of gamma titanium aluminide alloys are usually cast from the melt into a mold, with investment casting being the most popular approach, and then further processed. The as-cast articles sometimes have surface defects such as hot tears and surface-connected porosity due to shrinkage defects. These surface defects are deleterious to the properties of the article, either directly or by preventing the closure of interior porosity and shrinkage cavities during subsequent processing.

If the surface defects are not too severe, as is often the case, they may be repaired. However, existing repair techniques are not fully satisfactory in removing the surface defects. The inventors have recognized a need for an improved technique for repairing surface defects in gamma titanium aluminide articles. The present invention fulfills this need, and further provides related advantages.

SUMMARY OF THE INVENTION

The present invention provides a technique for repairing surface defects in gamma titanium aluminide articles, and repaired articles by this approach. The approach of the invention produces a sound surface and a sound internal structure.

In accordance with the invention, a method of repairing a gamma titanium aluminide article comprises the steps of providing an article of a gamma titanium aluminide alloy having a defect in the surface thereof, and repairing the defect by welding, typically using a welding filler metal. The weld repairing may leave surface-connected cracks in the weldment at the surface of the article. The method therefore further includes selecting a brazing filler metal that is chemically compatible with the gamma titanium aluminide alloy, applying the brazing filler metal to the area of the weldment, preferably in powdered form in a suitable binder and surrounded by a stop-off material, and heating the article to a brazing temperature at which the brazing filler metal is molten. The brazing filler metal is drawn into the surface-connected cracks by capillary action and, upon cooling, solidifies to close the surface-connected cracks. In this technique, two distinctly different filler metals are used, the welding filler metal and the brazing filler metal.

The article may be of any type made of the gamma titanium aluminide alloy, such as a component of a gas turbine engine. The weld repair is preferably accomplished by gas tungsten arc welding. The welding filler metal is preferably a gamma titanium aluminide alloy, and most preferably is of the same or about the same alloy composition as the region of the article being repaired. The brazing filler metal is of any type that is chemically compatible with the gamma titanium aluminide article and with the welding filler metal, but an alloy of about 70 weight percent titanium, about 15 weight percent copper, and about 15 weight percent nickel is preferred. The brazing filler metal is preferably provided in a powdered form that is placed into and adjacent to the surface-connected cracks. The article is heated to a temperature above the liquidus temperature of the brazing filler metal, so that the brazing filler metal melts, is drawn into and fills the cracks, and bonds to the weldment material on either side of each crack.

Desirably, the article repaired in this manner is thereafter hot isostatically pressed. The weld/braze repair is preferably performed before, not after, hot isostatically pressing, because the hot isostatic pressing is more effective in closing internal porosity and shrinkage cracks if the surface-connected porosity is first closed by the repair procedure. The hot isostatic pressing compresses the external surface of the article so as to remove the internal porosity and shrinkage cracks due to the differential pressure.

The present invention also provides a gamma titanium aluminide article comprising a body made of a gamma titanium aluminide alloy, the body having a repaired area. There is a weldment of a welding filler metal within the repaired area, with surface-connected weld defects therein. A brazing filler metal, which is chemically compatible with the gamma titanium aluminide alloy and the welding filler metal, is disposed within the surface-connected weld defects and bonded to the weldment.

The present approach to a combined welding and brazing technique for repairing gamma titanium aluminide articles is successful in repairing surface-damage areas in such articles. The results are superior to what could be achieved either by welding alone or brazing alone. The surface-connected cracks associated with weld repair are removed, and large sections of brazing filler metal deposit are avoided. The present approach may be used for initial repair of surface defects resulting from the casting or other production operations, or for repair of surface defects resulting from damage during service.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment

DETAILED DESCRIPTION OF THE INVENTION

Figure 1:
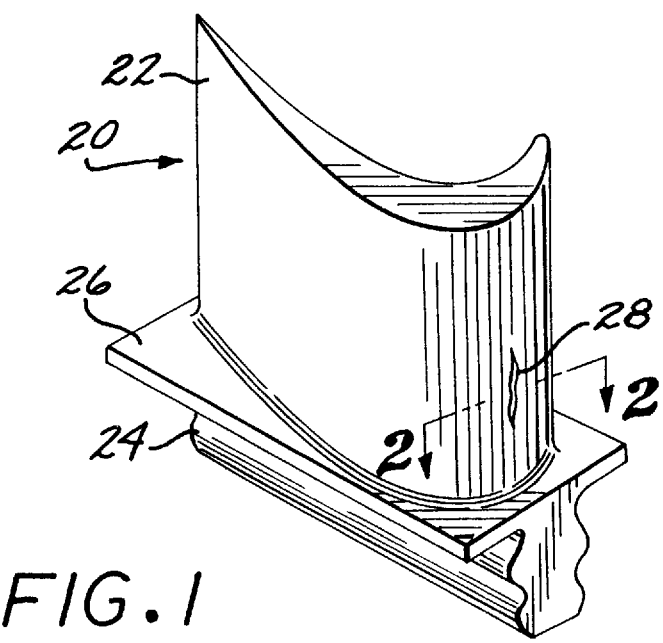
FIG. 1 is a perspective view of a gas turbine blade article.

FIG. 1 depicts a component of a gas turbine engine such as a turbine blade or turbine vane, and in this case a low-pressure turbine blade article 20, made of a gamma titanium aluminide alloy base metal. Other gas turbine components benefit from the repair approach of the invention, such as, for example, bearing supports, compressor casings, high pressure and low pressure hangars, frames, exhaust nozzle flaps, diffusers, and low pressure turbine brush seal supports. Components of other systems such as, for example, automotive valves and superchargers may also be made of gamma titanium aluminide alloys and will benefit from the repair procedure. The turbine blade 20 includes an airfoil 22 against which the flow of hot exhaust gas is directed. The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24.

As used herein, "gamma titanium aluminide" articles are those having compositions capable of forming the gamma ($\gamma$) titanium aluminide phase found generally at, slightly below, and slightly above the equiatomic composition in the titanium-aluminum system and in titanium-aluminum-X systems. (All compositions herein are stated in atomic percent unless indicated to the contrary.) Although the composition is based upon the titanium-aluminum system, alloying additions X (such as chromium and niobium) are provided in some gamma titanium aluminide alloys to modify and improve the properties for specific applications. The gamma titanium aluminide alloys of most interest are multiphase alloys comprising predominantly gamma phase, but which contain other phases such as alpha-two ($\alpha 2$) and/or beta-two ($\beta 2$) phases. The most preferred alloys have from about 42 to about 49 atomic percent aluminum, balance titanium and, optionally, other alloying elements X. However, the gamma phase field extends up to about 70 atomic percent aluminum, and such alloys are also considered gamma titanium aluminides.

Examples of operable gamma titanium aluminide alloys for use with the present invention include alloys having nominal compositions, in atomic percent, of 48 percent aluminum, 2 percent chromium, 2 percent niobium, balance titanium and minor amounts of impurities totalling 100 atomic percent (known as "Ti-48Al-2Cr-2Nb"); 48 percent aluminum, 2 percent manganese, 2 percent niobium, balance titanium and minor amounts of impurities totalling 100 atomic percent; 48 percent aluminum, 2 percent manganese, 2 percent niobium, balance titanium and minor amounts of impurities totalling 100 atomic percent, plus 0.8 volume percent titanium diboride ($TiB_2$); 47 percent aluminum, 5 percent niobium, 1 percent tungsten, balance titanium and minor amounts of impurities totalling 100 atomic percent; and 47 percent aluminum, 1 percent manganese, 2 percent niobium, balance titanium and minor amounts of impurities totalling 100 atomic percent.

According to conventional processing, the article such as the turbine blade 20 is cast from molten metal into a mold, typically an investment casting mold. The cast article is cooled to ambient temperature. As a result of the casting operation, a casting defect 28 is present at a surface 30 of the blade 20. (The present approach is applicable to other types of defects as well, such as those produced during service.)

Figure 2:
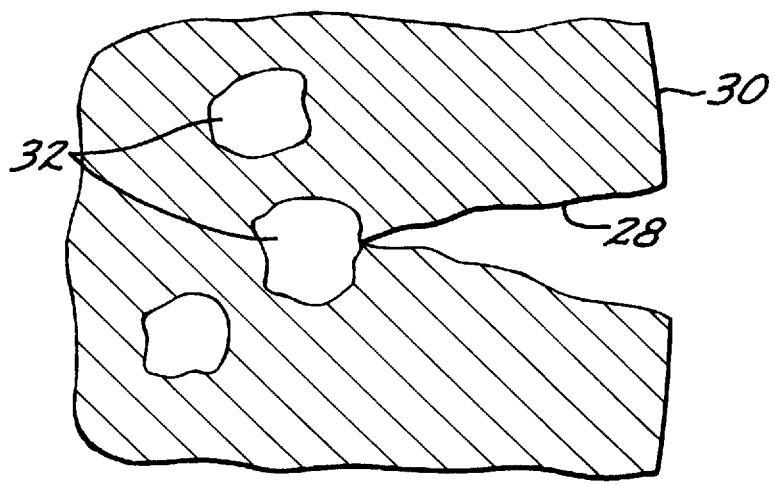
FIG. 2 is an enlarged sectional view through the article of FIG. 1, taken generally along line 2—2.

FIG. 2 illustrates the casting defect 28 in greater detail. In this case, the defect 28 is a large crack or opening extending inwardly toward the interior of the blade 20. Such an article also typically has interior porosity 32 resulting from the facts that the outer portion of the article solidifies first against the mold wall, and that the center portions of the article thereafter experience externally constrained shrinkage upon solidification that results in cavities and porosity. The interior porosity, or shrinkage cavity, may be entirely interior to the article or may be connected to the surface through the defect 28.

Figure 3:
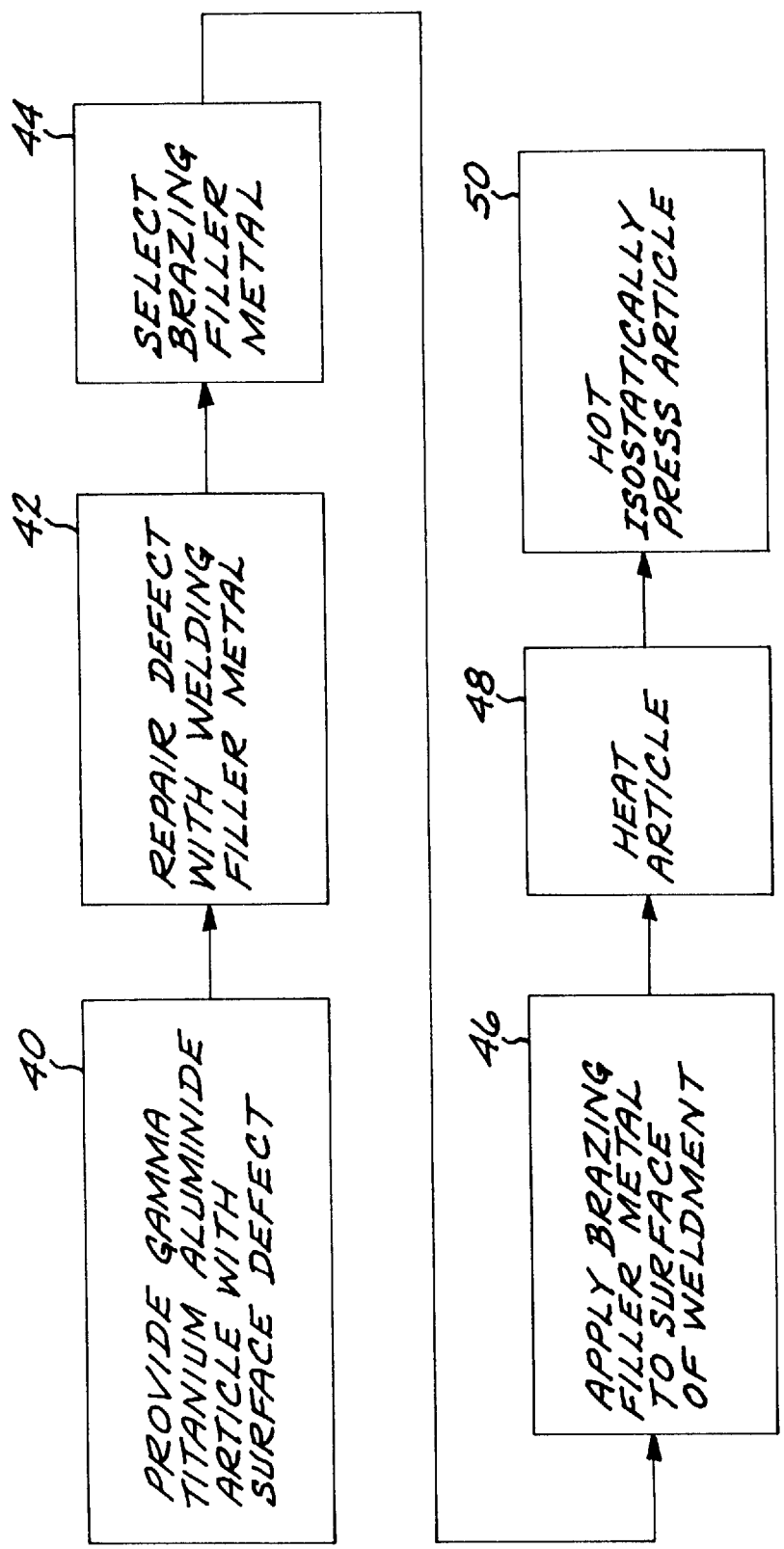
FIG. 3 is a block diagram of a process for repairing the article of FIG. 1, according to the invention.

FIG. 3 illustrates the repair procedure of the invention, as applied to such an article. The article 20 with the defect 28 and the interior porosity 32 is provided, numeral 40. The defect 28 is repaired by welding, numeral 42, preferably gas tungsten arc (GTA) welding. In GTA welding, the welding is conducted in an inert atmosphere. A tungsten electrode is used to initiate and hold an electric arc against the article being repaired. The arc melts a rod of welding filler metal and faces the molten welding filler metal to the region of the defect to effect the repair. The welding filler metal is preferably a gamma titanium aluminide alloy, and most preferably is of the same or about the same alloy composition as the region of the article being repaired adjacent to the defect 28.

Figure 4:
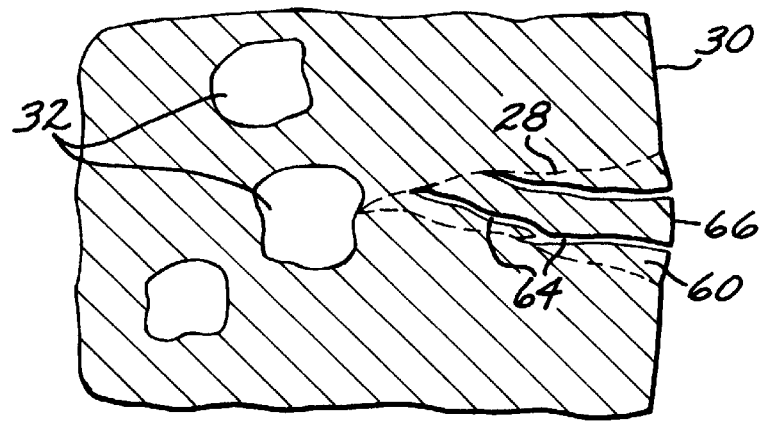
FIG. 4 is an enlarged sectional view like that of FIG. 2, after the welding portion of the repair.

The welding step 42 produces a weldment 60 of the welding filler metal that fills the defect 28 and bonds to the gamma titanium aluminide base metal 62 on either side of the weldment, see FIG. 4. (The dashed line defines the edges of the weldment metal that fills the original defect.) However, it is observed that sometimes there are surface-connected cracks 64 within the weldment 60. These surface-connected cracks 64 extend inwardly from a surface 66 of the weldment 60, into the interior of the blade 20. In some instances, they connect with the interior porosity 32, and in others they do not. However, in all cases the surface-connected cracks 64 are undesirable. These surface-connected cracks 64 cannot be readily repaired by further welding treatment, as such treatment produces even further surface connected cracks.

A brazing filler metal is selected, numeral 44. The brazing filler metal must be chemically compatible with the gamma titanium aluminide alloy and with the welding filler metal. That is, the brazing filler metal cannot produce deleterious phases or reaction products when it interdiffuses with the gamma titanium aluminide alloy base metal and the welding filler metal, either initially or after extended interdiffusion during service. The preferred brazing filler metal has a composition, in weight percent, of about 70 percent titanium, about 15 percent copper, and about 15 percent nickel. The brazing filler metal is preferably mixed with a brazing binder in an amount of about 10–15 percent by volume of binder, remainder filler metal, in order to form a paste consistency that is readily applied to the surface 66.

The preferred brazing binder is Braz-Binder Gel Grade ST, made by Vitta Corporation, Bethel, CT.

The selected brazing filler metal, mixed with the binder where present, is applied to the surface 66 of the weldment 60, and typically to a small region of the surface 30 of the base metal 62 adjacent to the weldment 60. To permit the brazing filler metal to be easily applied, it is preferably provided in a pre-alloyed powder form that is sprinkled or pressed onto the surface 66. To hold the brazing filler metal in place when it is later melted, a stop-off medium is placed around the weldment 60. The preferred stop-off medium is a commercially available paint that is applied to the surface which is not to be wetted adjacent to the brazing region, thereby acting as a dam to hold the brazing filler metal in place. Operable stop-off mediums include Stopyt Liquid 62A available from Wesgo and Nicobraze available from Wall Colmonoy Corp.

Preferably but not necessarily, after the step of repairing 42 and prior to the step of applying 46, the surfaces 66 and that portion of the surface 30 which is to be contacted by the brazing filler metal are cleaned. Cleaning is preferably accomplished by contacting with a solvent such as acetone and thereafter heating the article to a temperature of at least about 1800° F. and no more than about 2200° F. in a vacuum furnace at a vacuum of about $10^{-4}$ Torr or less.

After the brazing filler metal is applied, the article 20 is heated, numeral 48. Heating is preferably performed in two stages. In the first stage, the article is heated to a soaking temperature of no more than the solidus temperature of the brazing filler metal. The soaking temperature is preferably slightly below the solidus temperature of the brazing filler metal, and typically about 25° F. below the solidus temperature of the brazing filler metal. The article is held at that temperature for a time sufficient to equilibrate the temperature throughout the article, which time will vary according to the size of the article. This holding and equilibration at a temperature just below the solidus temperature is optional but preferred. The article is thereafter heated to a brazing temperature above the liquidus temperature of the brazing filler metal, at which temperature the brazing filler metal melts, flows, and is drawn into the surface-connected cracks 64 by capillary action. The brazing temperature is typically about 25°–50° F. above the liquidus temperature for the selected brazing filler metal. The article is held at the temperature for a minimum of about 10 minutes, but longer times are not harmful. The article is thereafter slowly cooled, preferably at a rate of from about 10° to about 25° F. per minute, to ambient temperature.

Figure 5:
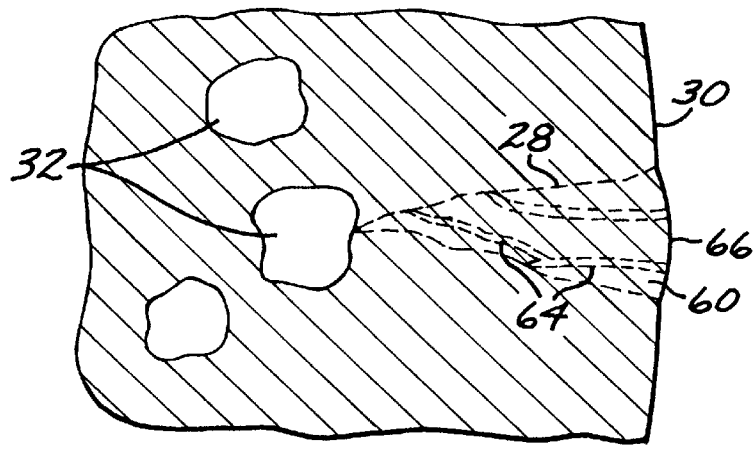
FIG. 5 is an enlarged sectional view like that of FIGS. 2 and 4, after the brazing portion of the repair.

FIG. 5 illustrates the resulting structure. The original defect 28 is filled by the weldment 60 of the welding filler metal, and the surface-connected cracks 64 in the weldment 60 are filled by the brazing filler metal. The interior porosity 32 remains, however.

To reduce or, ideally, completely close the interior porosity 32, the article is hot isostatically pressed, numeral 50. The hot isostatic pressing is preferably performed after the steps 42, 44, 46, and 48, inasmuch as the surface-connected cracks 64, if they reach and connect with the interior porosity 32, will inhibit the effectiveness of the hot isostatic pressing operation. By filling the surface-connected cracks 64 with the brazing filler metal, the subsequent hot isostatic pressing is rendered more effective.

Hot isostatic pressing is preferably performed at as high a temperature and for as long a time as reasonably practical without damaging the structure or functioning of the article 20. For the case of the preferred Ti-48Al-2Cr-2Nb gamma titanium aluminide base metal, the hot isostatic pressing procedure is preferably performed at a temperature of 2165° F. to 2300° F., an isostatic pressure of 25,000 to 30,000 pounds per square inch, and a time of 3 to 5 hours.

Figure 6:
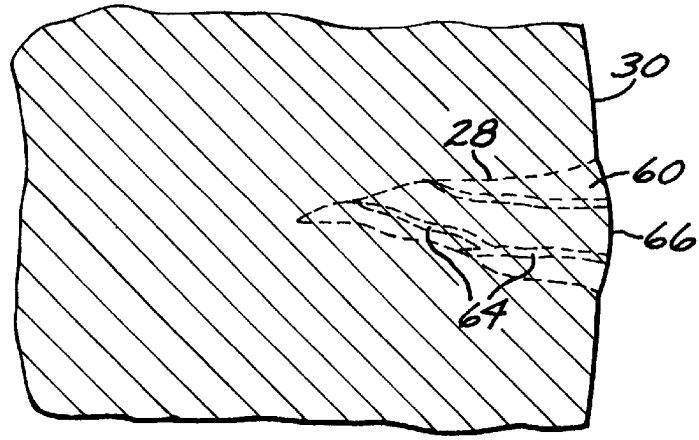
FIG. 6 is an enlarged sectional view like that of FIGS. 2, 4, and 5, after hot isostatic pressing is completed.

FIG. 6 illustrates the resulting structure, which is the final product of the processing of the article 20 of FIG. 1. The defect 28 remains closed by the weldment 60 made of the welding filler metal, the surface-connected cracks 64 remain filled by the brazing filler metal, and in addition the interior porosity 32 is removed. This final product thus has a sound surface structure without defects and porosity, as well as a sound interior with no interior porosity.

The present process has been practiced to demonstrate the operability of the approach.

This invention has been described in connection with specific embodiments and examples. However, those skilled in the art will recognize various modifications and variations of which the present invention is capable without departing from its scope as represented by the appended claims.

What is claimed is:

1. A method of repairing a gamma titanium aluminide article, comprising the steps of:

providing the article of the gamma titanium aluminide alloy having a defect in a surface thereof;

repairing the defect by welding using a weldment of a welding filler metal, the step of repairing leaving surface-connected cracks in a surface of the weldment;

selecting a brazing filler metal that is chemically compatible with the gamma titanium aluminide alloy and the welding filler metal;

applying the brazing filler metal to the surface of the weldment;

heating the article to a brazing temperature at which the brazing filler metal is molten; and cooling the article to ambient temperature, whereat the brazing filler metal is present in and fills the surface-connected cracks in the weldment.

2. The method of claim 1, wherein the step of providing the article includes the step of providing the article having the shape of a component of a gas turbine engine.

3. The method of claim 1, wherein the step of providing the article includes the step of providing the article having a composition, in atomic percent, selected from the group consisting of 48 percent aluminum, 2 percent chromium, 2 percent niobium, balance titanium and minor amounts of impurities totalling 100 atomic percent; 48 percent aluminum, 2 percent manganese, 2 percent niobium, balance titanium and minor amounts of impurities totaling 100 atomic percent; 48 percent aluminum, 2 percent manganese, 2 percent niobium, balance titanium and minor amounts of impurities totalling 100 atomic percent, plus 0.8 volume percent titanium diboride ($TiB_2$); 47 percent aluminum, 5 percent niobium, 1 percent tungsten, balance titanium and minor amounts of impurities totalling 100 atomic percent; and 47 percent aluminum, 1 percent manganese, 2 percent niobium, balance titanium and minor amounts of impurities totalling 100 atomic percent.

4. The method of claim 1, wherein the step of repairing includes the step of repairing the defect by gas tungsten the welding.

5. The method of claim 1, wherein the step of repairing includes the step of providing the welding filler metal of about the same composition as the gamma titanium aluminide alloy.

6. The method of claim 1, wherein the step of selecting the brazing filler metal includes the step of selecting the brazing filler metal having a composition, in weight percent, of about 70 percent titanium, about 15 percent copper, and about 15 percent nickel.

7. The method of claim 1, wherein the step of applying includes the step of providing a powder of the brazing filler metal.

8. The method of claim 1, wherein the step of heating includes the steps of heating the article to a soaking temperature of no more than a solidus temperature of the brazing filler metal and holding the article at the soaking temperature for a period of time sufficient to permit the article to reach thermal equilibrium at the soaking temperature, and thereafter heating the article to a temperature of above the solidus temperature.

9. The method of claim 1, including the additional steps, after the step of repairing and prior to the step of applying, of cleaning the surface of the weldment, and heating the article to a temperature of at least about 1800° F. and no greater than about 2200° F.

10. The method of claim 1, including an additional step, prior to the step of heating, of placing a stop-off medium around a region of the surface-connected cracks.

11. The method of claim 1, including an additional step, after the step of heating, of hot isostatically pressing the article, and wherein there has been no hot isostatic pressing step prior thereto.

12. A gamma titanium aluminide article prepared by the method of claim 1.

13. A gamma titanium aluminide article, comprising:

a body made of a gamma titanium aluminide alloy, the body having a repaired area therein;

a weldment of a welding filler metal within the repaired area, the weldment having surface-connected weld defects therein; and a brazing filler metal within the surface-connected weld defects and bonded to the weldment, the brazing filler metal being chemically compatible with the gamma titanium aluminide alloy and with the welding filler metal.

14. The article of claim 13, wherein the body is a component of a gas turbine engine.

15. The article of claim 13, wherein the article has a composition, in atomic percent, selected from the group consisting of 48 percent aluminum, 2 percent chromium, 2 percent niobium, balance titanium and minor amounts of impurities totalling 100 atomic percent; 48 percent aluminum, 2 percent manganese, 2 percent niobium, balance titanium and minor amounts of impurities totaling 100 atomic percent; 48 percent aluminum, 2 percent manganese, 2 percent niobium, balance titanium and minor amounts of impurities totalling 100 atomic percent, plus 0.8 volume percent titanium diboride ($TiB_2$); 47 percent aluminum, 5 percent niobium, 1 percent tungsten, balance titanium and minor amounts of impurities totalling 100 atomic percent; and 47 percent aluminum, 1 percent manganese, 2 percent niobium, balance titanium and minor amounts of impurities totalling 100 atomic percent.

16. The article of claim 13, wherein the welding filler metal has about the same composition as the gamma titanium aluminide alloy.

17. The article of claim 13, wherein the brazing filler metal has a composition, in weight percent of about 70 percent titanium, about 15 percent copper, and about 15 percent nickel.

18. The article of claim 13, wherein the article has substantially no internal porosity and shrinkage therein.

* * * * *